United States Patent
Yilmaz et al.

(10) Patent No.: US 10,231,262 B2
(45) Date of Patent: Mar. 12, 2019

(54) METHODS, ACCESS POINT AND WIRELESS DEVICE FOR CONTENTION-BASED ACCESS ON RADIO CHANNEL

(71) Applicant: TELEFONAKTIEBOLAGET LM ERICSSON (PUBL), Stockholm (SE)

(72) Inventors: Osman Nuri Can Yilmaz, Espoo (FI); Yue Zhao, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/551,749

(22) PCT Filed: Feb. 24, 2015

(86) PCT No.: PCT/SE2015/050209
§ 371 (c)(1),
(2) Date: Aug. 17, 2017

(87) PCT Pub. No.: WO2016/137367
PCT Pub. Date: Sep. 1, 2016

(65) Prior Publication Data
US 2018/0042044 A1 Feb. 8, 2018

(51) Int. Cl.
*H04W 74/00* (2009.01)
*H04W 74/08* (2009.01)
(Continued)

(52) U.S. Cl.
CPC ........... *H04W 74/004* (2013.01); *H04L 47/27* (2013.01); *H04W 28/0205* (2013.01);
(Continued)

(58) Field of Classification Search
CPC ............ H04W 52/0216; H04W 48/08; H04W 52/0232; H04W 84/045; H04W 24/10;
(Continued)

(56) References Cited

U.S. PATENT DOCUMENTS 9,756,518 B1 * 9/2017 Sheen ................... H04W 24/08
2007/0037548 A1 * 2/2007 Sammour ......... H04W 52/0235
455/343.2

(Continued)

FOREIGN PATENT DOCUMENTS

| EP | 3151626 A1 * | 4/2017 | ............ H04W 74/08 |
| WO | 2010057540 A1 | 5/2010 | |
| WO | 2013185858 A1 | 12/2013 | |

OTHER PUBLICATIONS

International Search Report with Written Opinion issued in Application No. PCT/SE2015/050209 dated Dec. 10, 2015, 10 pages.
(Continued)

*Primary Examiner* — Nizar N Sivji
(74) *Attorney, Agent, or Firm* — Rothwell, Figg, Ernst & Manbeck, p.c.

(57) ABSTRACT

A wireless device (202) is assisted by an access point (200) to perform contention based access on a radio channel for uplink transmission to the access point (200). The access point (200) obtains (2:1) a traffic load L on the radio channel and determines (2:2) a sleep window based on the traffic load L so that the sleep window increases when the traffic load L increases. The access point (200) then signals (2:3) the sleep window to the wireless device to instruct the wireless device to apply (2:4b) sleep mode according to the sleep window when the wireless device senses (2:4a) that the radio channel is busy. Thereby, the risk for congestion on the radio channel can be reduced during high traffic load and the energy consumption can also be reduced in the wireless device.

13 Claims, 6 Drawing Sheets

(51) Int. Cl.
  *H04W 28/12* (2009.01)
  *H04W 88/08* (2009.01)
  *H04W 28/02* (2009.01)
  *H04L 12/807* (2013.01)
  *H04W 52/02* (2009.01)

(52) U.S. Cl.
  CPC ....... *H04W 28/0284* (2013.01); *H04W 28/12* (2013.01); *H04W 52/0216* (2013.01); *H04W 74/006* (2013.01); *H04W 74/0833* (2013.01); *H04W 88/08* (2013.01); *H04W 28/02* (2013.01); *H04W 74/0816* (2013.01)

(58) Field of Classification Search
  CPC ............. H04W 76/048; H04W 74/004; H04W 28/0205; H04W 28/12; H04W 74/006; H04W 74/0833; H04W 88/08; H04W 28/02; H04W 74/0816
  See application file for complete search history.

(56) References Cited

U.S. PATENT DOCUMENTS

| | | | |
|---|---|---|---|
| 2011/0019602 A1 | 1/2011 | Park et al. | |
| 2015/0055555 A1* | 2/2015 | Kim | H04W 24/10 370/328 |
| 2017/0201909 A1* | 7/2017 | Kobayashi | H04W 24/02 |

OTHER PUBLICATIONS

LAN/MAN Standards Committee of the IEEE Computer Society: "IEEE P802.11ah™/D3.0, Draft Standard for Information technology—Telecommunications and information exchange between systems Local and metropolitan area networks—Specific requirements, Part11: Wireless LAN Medium Access Control (MAC) and Physical Layer (PHY) Specifications, Amendment 6: Sub 1 GHz License Exempt Operation", Oct. 2014, 611 pages.

Lin, Hsiang-Ho et al. :"Deep Sleep: IEEE 802.11 enhancement for energy-harvesting machine-to-machine communications", Wireless Networks; Feb. 2015, vol. 21, Issue 2, Published online Aug. 15, 2014, Springer Science+Business Media New York, pp. 357-370.

Zeng, Zheng et al.: "SOFA: A Sleep-Optimal Fair-Attention Scheduler for the Power-Saving Mode of WLANs", Distributed Computing Systems (ICDCS), 2011 31st International Conference on Jun. 20-24, 2011, 12 pages.

Levanen, Toni A.: "Radio Interface Evolution Towards 5G and Enhanced Local Area Communications", IEEE Access, Next Generation Mobile Communications and Networking, vol. 2, Sep. 2014, 25 pages.

Baiamonte, V.: "Saving Energy during Channel Contention in 802.11 WLANs", Mobile Network and Applications 11, 2006, pp. 287-296.

Chen, Shengbo et al.: "Life-Add: Lifetime Adjustable Design for WiFi Networks with Heterogeneous Energy Supplies", 2013 11th International Symposium and Workshops on Modeling and Optimization in Mobile, Ad Hoc and Wireless Networks (WiOpt), May 13-17, 2013, 8 pages.

ETSI TR 101 557 v1.1.1 (Feb. 2012) 51 pages.

Supplementary European Search Report issued in Application No. EP 15 88 3510 dated Jan. 26, 2018, 5 pages.

Ahmadi, S., "An overview of next-generation mobile WiMAX technology—[WiMAX update]", IEEE Communication Magazine, IEEE Service Center, Piscataway, US, vol. 47, No. 6, Jun. 1, 2009, XP011263350, pp. 84-98.

Sahebi, M.R., "The method to Dynamically Determine the Optimal Parameter Tmin for Energy Saving in IEEE 802.16e, with Light Traffic Load", Advanced Computer Theory and Engineering, 2008. ICACTE '08. International Conference on, IEEE, Piscataway, NJ, USA, Dec. 20, 2008, XP031399914, pp. 754-758.

* cited by examiner

METHODS, ACCESS POINT AND WIRELESS DEVICE FOR CONTENTION-BASED ACCESS ON RADIO CHANNEL

CROSS REFERENCE TO RELATED APPLICATION(S)

This application is a 35 U.S.C. § 371 National Stage of International Patent Application No. PCT/SE2015/050209, filed Feb. 24, 2015, designating the United States, the disclosure of which is incorporated by reference.

TECHNICAL FIELD

The present disclosure relates generally to an access point, a wireless device and methods therein, for contention-based access on a radio channel for uplink transmission to the access point.

BACKGROUND

In the field of mobile or wireless communication, it is becoming increasingly common to employ so-called "Machine-to-Machine", M2M, devices which are typically installed at certain locations to operate automatically by sending and receiving data according to a predefined behavior. For example, equipment and procedures have been developed for monitoring various locations, areas and functions that need to be supervised, where M2M devices can be installed at different locations within a monitored area to perform some predefined operational task such as measuring, counting, detecting or sensing, and typically reporting the result to a central server or the like. These devices may be configured to measure or observe some metric or parameter of interest, such as temperature, pressure, voltage, battery level, light, motion, sound, presence of objects, presence of smoke, to mention a few illustrative examples.

Some common examples of M2M device installations include public and private buildings, infrastructures, vehicles, industrial premises, machines, communication networks, and so forth. The M2M devices typically use radio access over a radio network to report sensor data comprising information about their measurements and observations to the server, e.g. at regular intervals or triggered by occurrence of an event, e.g. detection of motion, sound, vibration, light, smoke, temperature rise, and so forth. The M2M devices are thus configured to operate automatically without human intervention. The following description is however not limited to M2M devices and the more generic term "wireless device" will thus be used herein.

In order to enable such automatic communication by wireless devices, the communications need to be executed with great efficiency in terms of energy consumption so that the devices can continue to operate automatically as long as possible without human intervention, i.e. without running out of battery or other power supply. It is a problem that such devices are typically powered by a battery of limited lifetime or by a power source with very limited capacity such as a solar cell or other regenerative power source.

In either case, when a wireless device stops operating due to lack of power, a person is required to go to the physical location where the device resides and make sure it operates properly again which may be a burden especially if the device is located far away or is difficult or virtually impossible to access for whatever reason, and there may further be a need to maintain operation of numerous devices at several locations distributed over a large area. It may therefore be quite costly and time consuming to have one or more persons going to all these locations, e.g. just to change or recharge their batteries from time to time.

A typical scenario is that the wireless device sends relatively small amounts of data on frequent occasions over an access point that is connected to a communication network. The wireless device therefore needs to connect to the access point for each communication involving a setup procedure to obtain access reservation on a radio channel for uplink transmission of data. In order to achieve low power consumption in the wireless device, it has been suggested in the Third Generation Partnership project, 3GPP, that contention-based uplink transmission can be employed instead of requiring access reservation for each communication, thus omitting the energy-consuming access reservation process. Some examples of how contention-based uplink transmissions can be employed are described in WO 2010057540 A1.

Contention-based uplink transmission means that any wireless device can transmit data to an access point anytime on a shared radio channel without reserving radio resources in advance, at the risk of collision when two or more wireless devices happen to transmit simultaneously such that the access point is not able to decode the transmissions. To avoid such collisions the wireless devices are typically configured to first sense, i.e. listen to, the radio channel and wait until there are no transmissions going on, thus detecting that the radio channel is "idle" and not "busy", before transmitting its own data.

FIG. 1 illustrates a communication scenario where the feature of contention-based uplink transmission is employed e.g. on a specific uplink radio channel reserved for such transmissions. This figure shows that multiple wireless devices D1-D6 are being served by an access point 100 e.g. in a cell 102. In reality, there may be a much larger number of devices being served by the same network node and this figure only illustrates this schematically. Dashed arrows illustrate that the devices D1-D6 sense the radio channel before transmitting their data. When not transmitting, the wireless devices are inactive to save power and wake up again when it is time for next transmission. This type of contention-based scheme is typically employed for wireless communications in license-free frequency bands, e.g. in Wireless Local Area Network, WLAN, systems, or Wi-Fi, according to the standard document IEEE 802.11, Draft 2.0, as well as other wireless technologies such as Bluetooth, Zigbee and Z-Wave. The mechanism of listening to the radio channel before transmitting is sometimes referred to as Carrier Sense Multiple Access, CSMA/Collision Avoidance, CA.

It is however a problem that a wireless device may need to be active and sense the radio channel for quite long time before it becomes idle and data can be transmitted, such that considerable amounts of energy are still consumed when sensing the channel. For example, the wireless device may not be able to detect how long an ongoing transmission will last before the channel becomes idle. It has therefore been proposed that instead of sensing the radio channel continuously the wireless device shall sense the radio channel periodically by entering sleep mode for a period of time if the channel is busy and then wake up and try again to sense the channel after the sleep period. This scheme is described in the article "DeepSleep: IEEE 802.11 enhancement for energy-harvesting Machine-to-Machine communications", Global Communications Conference (GLOBECOM), 2012 IEEE. IEEE, 2012. In this scheme, the sleep period is of fixed length which may not be optimal for all situations, e.g.

when the sleep mode causes unwanted delay of the transmission or when the wireless device have to wake up and sense the radio channel several times only to find that it is still busy.

SUMMARY

It is an object of embodiments described herein to address at least some of the problems and issues outlined above. It is possible to achieve this object and others by using an access point, a wireless device and methods therein as defined in the attached independent claims.

According to one aspect, a method is performed by an access point for assisting a wireless device to perform contention-based access on a radio channel for uplink transmission to the access point. In this method, the access point obtains a traffic load L on the radio channel, and determines a sleep window for the wireless device based on the obtained traffic load L on the radio channel so that the sleep window increases when the traffic load L increases. The access point then signals the sleep window to the wireless device to instruct the wireless device to apply sleep mode according to the sleep window when the wireless device senses that the radio channel is busy.

According to another aspect, an access point is arranged to assist a wireless device to perform contention-based access on a radio channel for uplink transmission to the access point. The access point comprises a processor and a memory. The memory comprises instructions executable by the processor whereby the access point is operative to:
  obtain a traffic load L on the radio channel,
  determine a sleep window for the wireless device based on the obtained traffic load L on the radio channel so that the sleep window increases when the traffic load L increases, and
  signal the sleep window to the wireless device to instruct the wireless device to apply sleep mode according to the sleep window when the wireless device senses that the radio channel is busy.

According to another aspect, a method is performed by a wireless device for contention-based access on a radio channel for uplink transmission to an access point. In this method, the wireless device receives a sleep window from the access point which sleep window is dependent on a traffic load L on the radio channel so that the sleep window increases when the traffic load L increases. The wireless device then applies sleep mode according to the sleep window when the wireless device senses that the radio channel is busy.

According to another aspect, a wireless device is arranged for contention-based access on a radio channel for uplink transmission to an access point. The wireless device comprises a processor and a memory. The memory comprises instructions executable by the processor whereby the wireless device is operative to:
  receive a sleep window from the access point which sleep window is dependent on a traffic load L on the radio channel so that the sleep window increases when the traffic load L increases, and
  apply sleep mode according to the sleep window when the wireless device senses that the radio channel is busy.

When the above access point, wireless device and/or methods are used, the risk for congestion on the radio channel may be reduced during high traffic load and the energy consumption may also be reduced or limited in the wireless device. The above access point, wireless device and methods therein may be configured and implemented according to different optional embodiments to accomplish further features and benefits, to be described below.

A computer program is also provided comprising instructions which, when executed on at least one processor in either of the access point and the wireless device, cause the at least one processor to carry out the method described above for the score management node. A carrier is also provided which contains the above computer program, wherein the carrier is one of an electronic signal, optical signal, radio signal, or a non-tangible computer readable storage medium.

BRIEF DESCRIPTION OF DRAWINGS

The solution will now be described in more detail by means of exemplary embodiments and with reference to the accompanying drawings, in which.

DETAILED DESCRIPTION

In this disclosure a solution is presented where a wireless device is assisted by an access point for performing contention-based access on a radio channel for uplink transmission to the access point. This radio channel may be used for uplink and/or downlink transmissions to or from various wireless devices being served by the access node. Briefly described, the access point signals a traffic load dependent sleep window to the assisted wireless device, to be applied in sleep mode when the channel is busy, i.e. occupied by other transmissions, and the wireless device should not transmit. By adapting the duration or size of the sleep window to the traffic load on the radio channel, the risk for collision on the radio channel as well as the energy consumption in the device can be reduced, which will be explained in more detail below.

Figure 1:
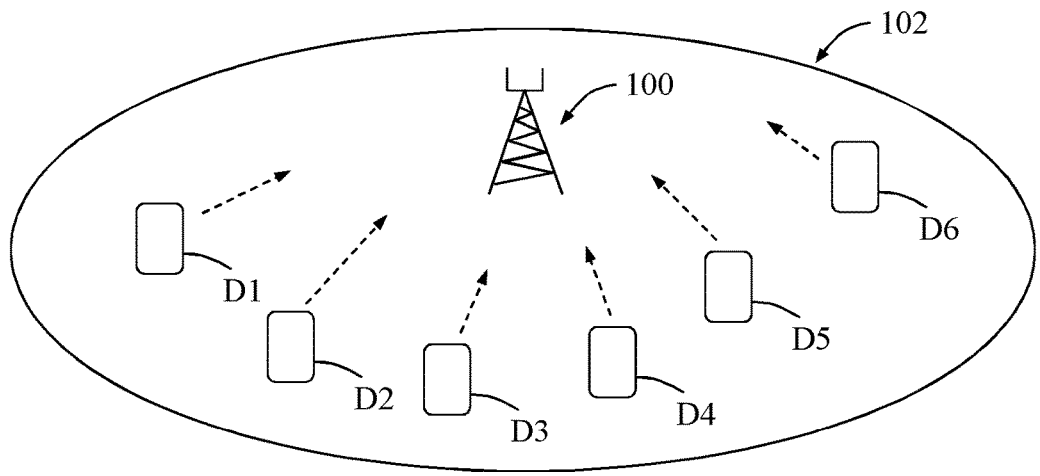
FIG. 1 is a communication scenario illustrating contention-based uplink transmission on a shared radio channel, according to the prior art.
Figure 2:
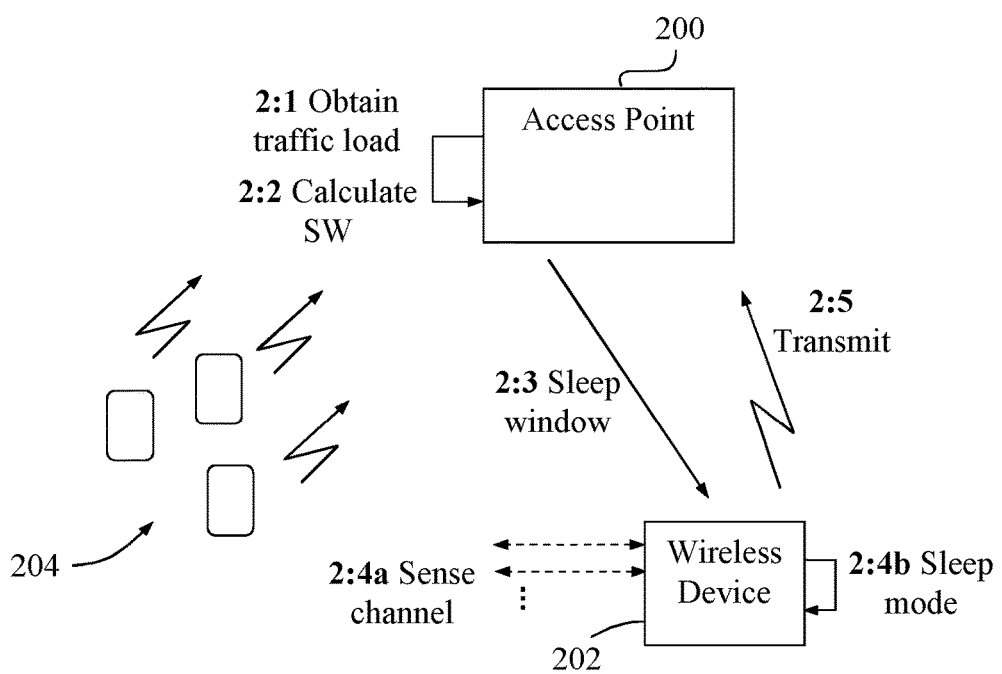
FIG. 2 is a communication scenario illustrating how sleep mode may be employed for contention-based uplink transmission, according to some possible embodiments.

An example of a procedure according to the above is illustrated in FIG. 2 involving an access point 200 and a wireless device 202. A shared radio channel is available for uplink transmissions to the access point 200 such as random access requests and other signals. It may be assumed that other wireless devices 204 are transmitting access related uplink signals at various points to the access point 200 causing a certain amount of traffic on the radio channel used for such access related uplink signals. In a first shown action 2:1 the access point 200 obtains a traffic load L on the radio channel, which is indicative of how much the radio channel is occupied e.g. by uplink or downlink transmissions from or to the other wireless devices 204, e.g. any transmissions performed in an access procedure. The access point 200 is able to determine the traffic load L basically by measuring or detecting the extent of transmissions or other technologies utilizing the radio channel.

In a next action 2:2 the access point 200 determines or calculates a sleep window SW based on the traffic load L so that the sleep window increases when the traffic load L increases. For this purpose a predefined function may be employed using the traffic load L as input, which will be described in more detail later below. The duration of the sleep window can thereby be adapted to the traffic load such that energy consumption in the device for sensing the radio channel can be reduced when the traffic load is high, and also the risk for collisions on the channel can also be reduced by increasing the sleep window duration when the traffic load is high. The access point 200 then signals the sleep window to the wireless device in a further action 2:3, to instruct the wireless device to apply sleep mode according to the sleep window.

Accordingly, another action 2:4a illustrates that the wireless device 202 senses the radio channel and when it is busy the wireless device enters sleep mode in an action 2:4b for a duration according to the signaled sleep window. After the sleep period the wireless device wakes up and senses the radio channel once again thus repeating action 2:4a. If the channel is still busy, the wireless device 202 repeats actions 2:4b and 2:4a. If the radio channel remains busy, the wireless device 202 may repeat actions 2:4b and 2:4a until a maximum number of sleep mode periods is reached when the wireless device starts to sense the radio channel continuously instead. The maximum number of sleep mode periods may be signaled by the access point 200 to the wireless device 202. Eventually, the radio channel becomes idle and the wireless device 202 can transmit an access related uplink signal on the radio channel to the access point 200 such as a random access request.

An example of how the solution may be employed will now be described with reference to the flow chart in FIG. 3 which illustrates a procedure with actions performed by an access point in radio communication with a wireless device, to accomplish the functionality described above. The access point and the wireless device in this example may be the above-described access point 200 and the wireless device 202, respectively, in FIG. 2. The access point is operative to assist the wireless device to perform contention-based access on a radio channel for uplink transmission to the access point.

A first action 300 illustrates that the access point obtains a traffic load L on the radio channel, basically as described above for action 2:1. For example, the traffic load L may in this action be measured, detected or estimated based on uplink signals received by the access point. In another action 302, the access point determines a sleep window for the wireless device based on the obtained traffic load L on the radio channel so that the sleep window increases when the traffic load L increases, and vice versa. Some examples of how the sleep window may be determined and adapted to the traffic load L will be described below.

A final shown action 304 illustrates that the access point signals the sleep window to the wireless device to instruct the wireless device to apply sleep mode according to the sleep window when the wireless device senses that the radio channel is busy. For example, the sleep window may be signaled over a so-called "DTIM" (Delivery Traffic Indicator Map) beacon, and/or over a so-called "TIM/S1G" (Traffic Indicator Map/Sub 1 Ghz) beacon which may be employed for configuration of different groups of devices. The above beacons are defined in IEEE 802.11. Further, a TIM/S1G beacon may be signaled for a certain TIM group or other subgroup of devices according to IEEE 802.11.

Various optional embodiments may be used in the above-described procedure in the access point. In some possible embodiments, the access point may signal the sleep window in action 304 by broadcasted signaling or by dedicated signaling to the wireless device. For example, the access point may signal the sleep window in dedicated signaling upon receiving a request for sleep parameters from the wireless device. Some examples of signaling alternatives will be described below with reference to FIGS. 6 and 7.

In another possible embodiment, the access point may signal the sleep window as a minimum duration SWmin and a maximum duration SWmax to instruct the wireless device to use a sleep duration in the sleep mode between the minimum duration SWmin and the maximum duration SWmax. The sleep window signaling is thereby flexible in that the wireless device is able to choose any suitable duration within SWmin and SWmax, e.g. depending on how delay-sensitive, or delay-tolerant, the wireless device is.

If the latter embodiment is used, further embodiments are possible to employ as follows. In one possible embodiment, the access point may determine the minimum duration SWmin by applying a first function "f(L)" on the traffic load L and determine the maximum duration SWmax by applying a second function "g(L)" on the traffic load L. In this case, the access point may, in another possible embodiment, apply the first function f(L, Tbusy) and the second function g(L, Tbusy) further based on an expected busy channel duration denoted "Tbusy" which comprises an expected transmission time TTx of a competing user of the radio channel, i.e. another wireless device transmitting signals to the access node on the channel. In another possible embodiment, the access point may calculate the above busy channel duration Tbusy as $$Tbusy=TTx+TSIFS+TACK,$$

Where TSIFS is a duration of a so-called Short Inter-Frame Space, SIFS which is the time required for the competing user to process a frame received from the access point, and TACK is a duration of acknowledgement to the competing user. Thus, the radio channel is estimated to remain occupied by the competing user for a total duration Tbusy being the sum of the above durations TTx, TSIFS and TACK.

In yet another possible embodiment, the access point may signal to the wireless device a maximum number of sleep mode periods before the wireless device should start to sense the radio channel continuously if the radio channel is still busy, that is occupied by transmissions from other users. Thereby, the wireless device is less likely to miss a period of not busy by being in sleep mode. For example the wireless device may have pending data to transmit which is more or less delay-sensitive or delay tolerant, e.g. depending on the type of service being used by the device. A real-time service such as a voice/video call is typically more delay-sensitive than a service of downloading a web page or the like.

In yet another possible embodiment, the access point may update the sleep window when the traffic load L on the radio channel changes, and signal the updated sleep window to the wireless device. Thereby, the sleep window can be adapted to the changing traffic situation e.g. by employing longer sleep duration when the traffic becomes more dense and vice versa.

The access point may, in another possible embodiment, target the sleep window only to energy critical wireless devices, that is devices for which it is desirable to consume as little energy as possible, e.g. M2M devices which should operate automatically as long as possible without human intervention. It may thus not be motivated to target the sleep window to other less energy critical wireless devices since some extra signaling and functionality are required for this procedure.

Another example of how the solution may be employed at the device side, will now be described with reference to the flow chart in FIG. 4 which illustrates a procedure with actions performed by a wireless device in radio communication with an access point, which again may be the wireless device 202 and the access point 200, respectively, in FIG. 2. The wireless device is operative for contention-based access on a radio channel for uplink transmission to the access point. A dashed arrow between FIGS. 3 and 4 indicates schematically that the time window signaled by the access point in action 304 of FIG. 3 is received by the wireless device in the procedure of FIG. 4.

A first action 400 thus illustrates that the wireless device receives a sleep window from the access point, the sleep window being dependent on a traffic load L on the radio channel so that the sleep window increases when the traffic load L increases, and vice versa. In some possible embodiments, the wireless device may receive the sleep window in broadcasted signaling or in dedicated signaling. In another possible embodiment, the wireless device may send a request for sleep parameters to the access point before receiving the sleep window in dedicated signaling. The dedicated signaling may in some cases be preferable since it can be transmitted to a particular device with less power than broadcast transmissions and also only when requested thus avoiding broadcasting when there is no-one that will use the sleep window anyway.

In another action 402, the wireless device senses the radio channel that is to detect whether the channel is busy or free for transmitting an access related uplink signal. If the wireless device determines in a following action 404 that the sensed radio channel is busy, the wireless device applies sleep mode according to the sleep window, in another action 406. When the sleep period is over according to the received sleep window, the wireless device wakes up and returns to action 402 to sense the radio channel again. On the other hand, whenever the sensed radio channel is found not busy in action 404, the wireless device is able to take the opportunity to transmit an access related signal such as a random access request on the radio channel, as shown in an action 408.

Various further optional embodiments may be used in the above-described procedure in the wireless device as well. In a possible embodiment, the wireless device may receive the sleep window in action 400 as a minimum duration SWmin and a maximum duration SWmax, which is effectively an instruction to use a sleep duration in the sleep mode between the minimum duration SWmin and the maximum duration SWmax. Some examples have been described above of how the access point may determine or calculate SWmin and SWmax.

In that case, the wireless device may, in another possible embodiment, use the maximum duration SWmax after a first time the wireless device senses that the radio channel is busy, and then use a random sleep duration between the minimum duration SWmin and the maximum duration SWmax after a next time the wireless device senses that the radio channel is busy. In this embodiment, the first sleep period is thus longer than the following sleep period(s) so that much energy is saved at first in the device but after that further excessive delay for the upcoming transmission can be avoided. In an alternative embodiment, the wireless device may use a randomly selected sleep duration between the minimum duration SWmin and the maximum duration SWmax after each time the wireless device senses that the radio channel is busy. This latter embodiment may be useful if the device is not very delay-sensitive.

In another possible embodiment, if the wireless device is delay-sensitive the wireless device may reduce the sleep duration after each time the wireless device senses that the radio channel is busy, that is to avoid excessive delays. On the other hand if the wireless device is delay-insensitive the wireless device may, in another possible embodiment, increases the sleep duration after each time the wireless device senses that the radio channel is busy.

Figure 5:
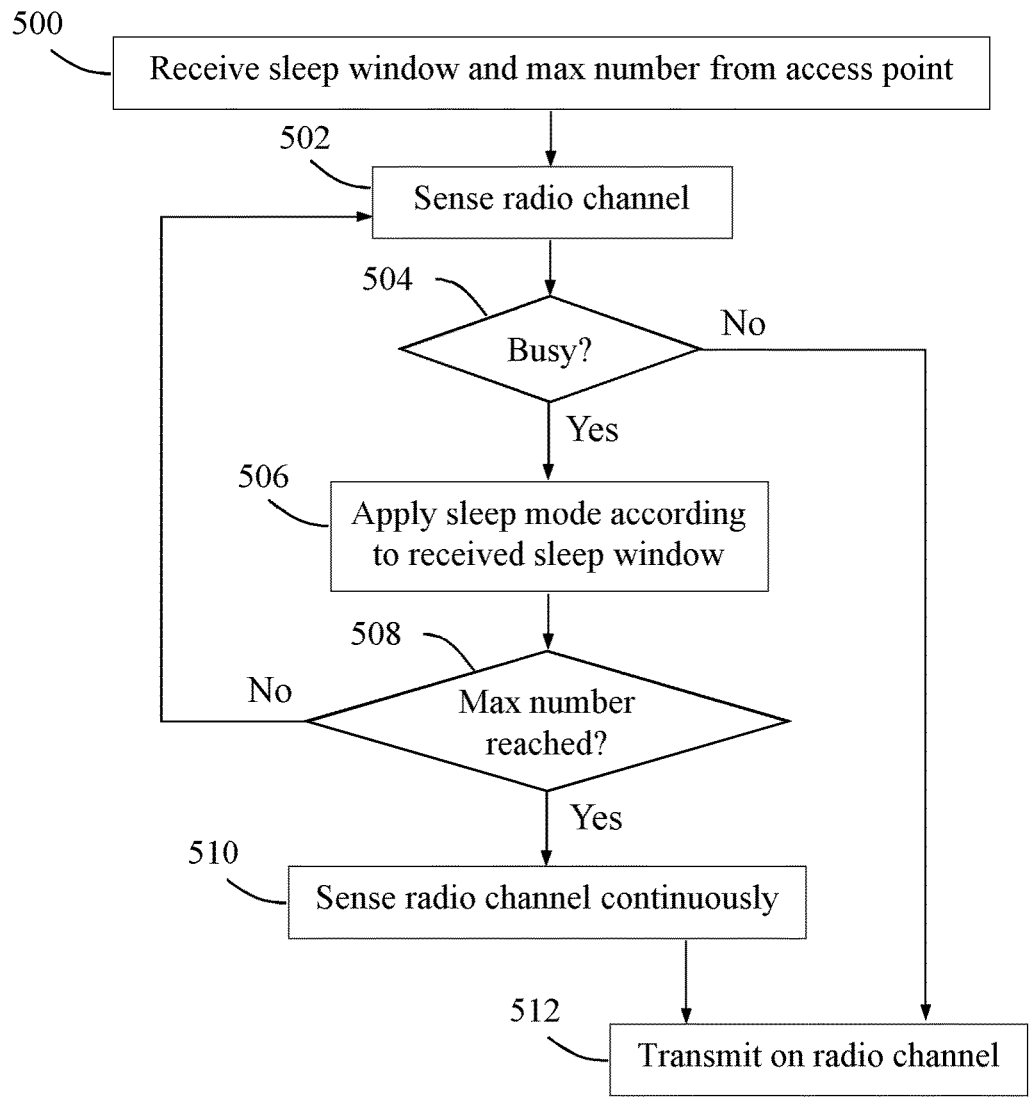
FIG. 5 is a flow chart illustrating a more detailed example of a procedure in a wireless device, according to further possible embodiments.

It was described above that the access point may signal to the wireless device a maximum number of sleep mode periods before the wireless device should start to sense the radio channel continuously if the radio channel is still busy. In another possible embodiment, the wireless device may thus start to sense the radio channel continuously if the radio channel is still busy after a maximum number of sleep mode periods, which the wireless device may receive from the access point or obtain otherwise. An example of a procedure performed by a wireless device when the above maximum number of sleep mode periods, thus corresponding to the number of access attempts, is employed, will now be described with reference to the flow chart in FIG. 5.

A first action 500 illustrates that the wireless device receives a sleep window from the access point, as described for action 400 above, and also a maximum number of sleep mode periods before the wireless device should start to sense the radio channel continuously if the radio channel is still busy. The sleep window and the maximum number of sleep mode periods may be received jointly in the same signaling, either broadcasted or dedicated, or in separately signaled messages such as a broadcasted message and a dedicated message signaled to the device, respectively. For example, it may be desirable to adapt the maximum number of sleep mode periods to suit this particular wireless device, e.g. depending on how delay-sensitive it is.

In a next action 502 the wireless device senses the radio channel, and the wireless device determines in another action 504 whether the channel is busy or not, basically as described above for actions 402 and 404, respectively. If the channel is busy, the wireless device applies sleep mode according to the received sleep window, in another action 506 corresponding to action 406.

When the sleep period is over according to the received sleep window, the wireless device wakes up and further determines in this example, in an action 508, whether the maximum number of sleep mode periods has been reached, that is if the wireless device has entered sleep mode the maximum number of times. If not, the wireless device returns to action 502 to sense the radio channel again and repeats the subsequent actions.

On the other hand, if the maximum number of sleep mode periods has been reached in action 508, the wireless device should start to sense the radio channel continuously, as shown in an action 510. It is assumed that the radio channel sooner or later becomes idle and available for transmission such that the wireless device is able to transmit an access related signal on the radio channel, in a following action 512. Further, whenever the sensed radio channel is found not busy in action 504, the wireless device is able to transmit an access related signal on the radio channel and can therefore proceed directly to action 512.

Figure 6:
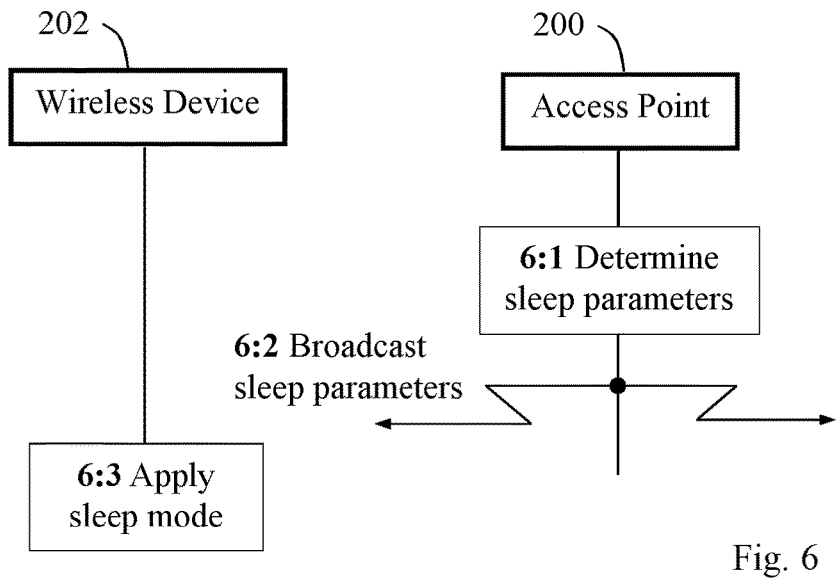
FIGS. 6 and 7 are signaling diagrams illustrating examples of how a sleep window can be signaled when the solution is used, according to further possible embodiments.

FIG. 6 illustrates an example of how the access point 200 and the wireless device 202 of FIG. 2 may communicate in this solution, that is to communicate the sleep window as sleep parameters which are first determined or obtained by the access point 200 in an action 6:1. In another action 6:2 the access point 200 broadcasts the sleep parameters, e.g. over a DTIM beacon or a TIM/S1G beacon, which can be received by any wireless device within radio coverage, such as the wireless device 202. A final action 6:3 simply illustrates that the wireless device 202 applies sleep mode according to the broadcasted sleep parameters, e.g. in the manner described for FIGS. 4 and 5.

Figure 7:
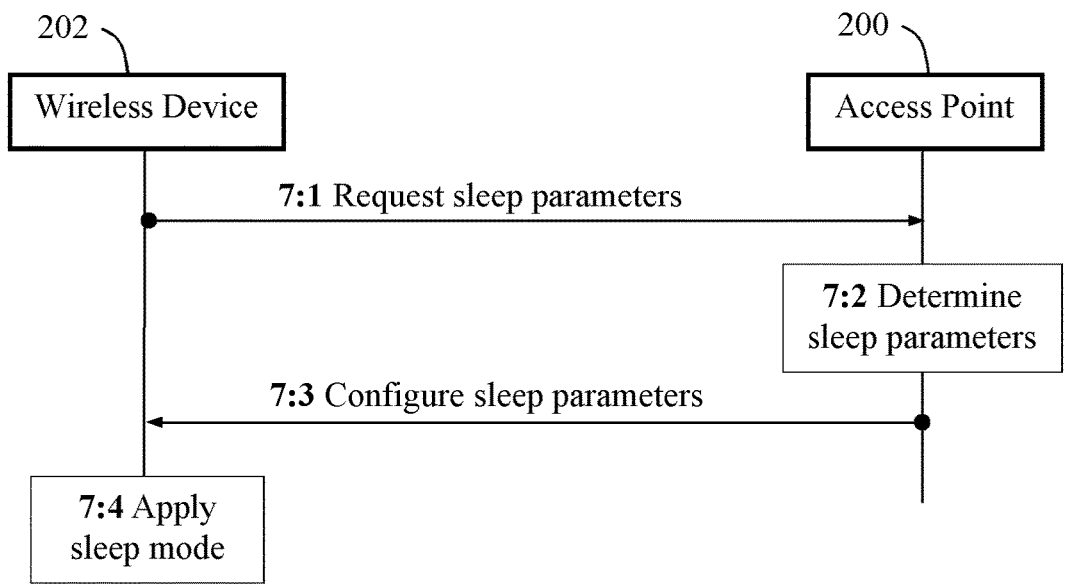

FIG. 7 illustrates another example when the access point 200 receives a request for sleep parameters from the wireless device 202 in an action 7:1. The access point 200 determines the sleep parameters in an action 7:2. In this action the access point 200 may adapt the sleep parameters to the wireless device 202. Some examples of how the sleep window or sleep parameters can be adapted to the wireless device have been described above. In another action 7:3 the access point 200 sends the sleep parameters to the wireless device 202 in a dedicated configuring message or the like. A final action 7:4 illustrates that the wireless device 202 applies sleep mode according to the broadcasted sleep parameters, as in action 6:3 above.

Potential advantages that may be achieved when using any of the above-described embodiments include more efficient usage of sleep mode for contention-based access to a radio network through a shared radio channel. In particular, it is possible to avoid unnecessary energy consumption in the wireless device and also to reduce the risk for collision on the radio channel during dense traffic. The sleep behavior can further be individually adapted and optimized for the wireless device and according to the prevailing traffic load.

Figure 8:
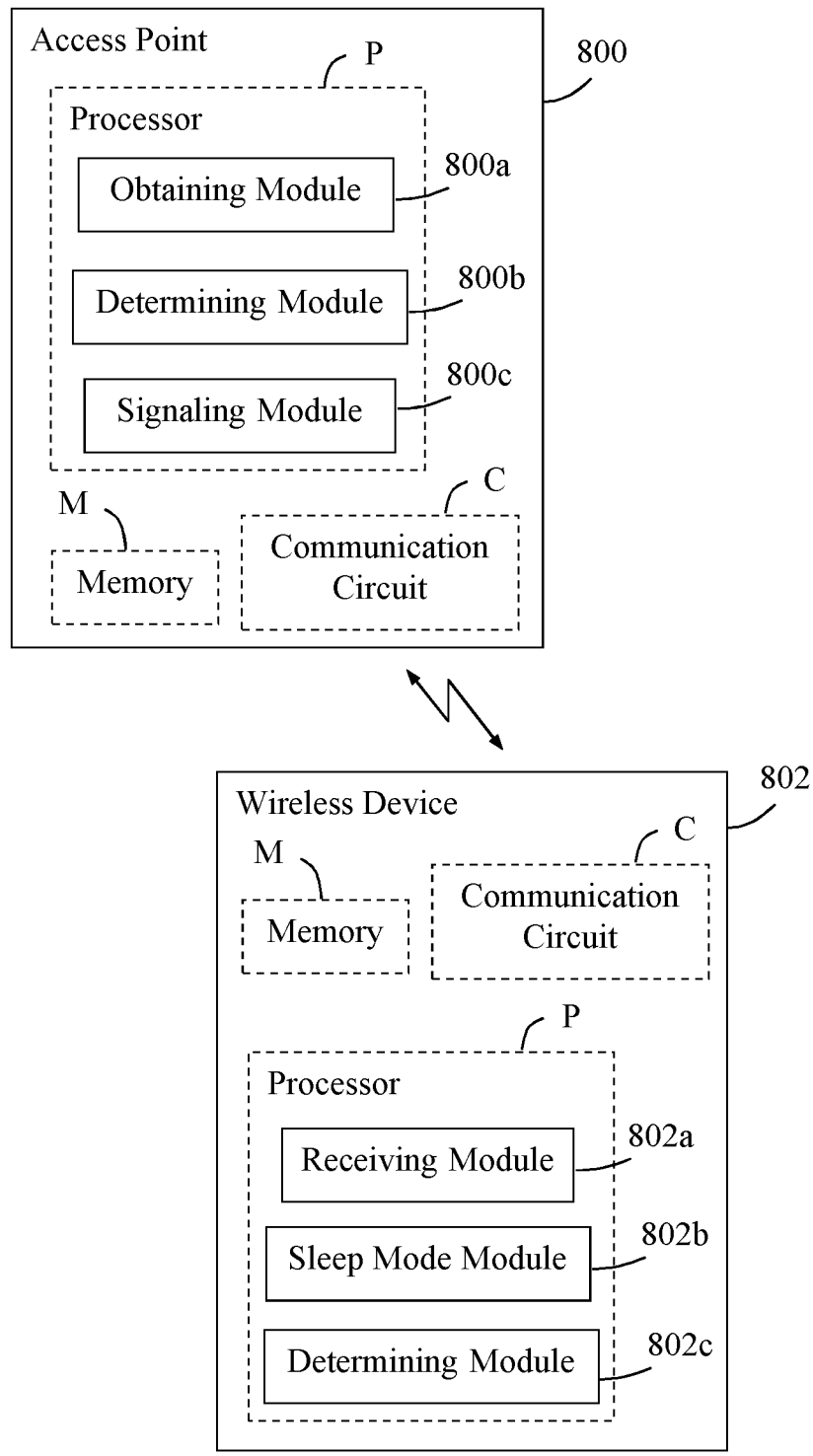
FIG. 8 is a block diagram illustrating an access point and a wireless device in more detail, according to further possible embodiments.

The block diagram in FIG. 8 illustrates a detailed but non-limiting example of how an access point 800 and a wireless device 802, respectively, may be structured to bring about the above-described solution and embodiments thereof. In this figure, the access point 800 and the wireless device 802 may be configured to operate according to any of the examples and embodiments of employing the solution as described above, where appropriate, and as follows. Each of the access point 800 and the wireless device 802 is shown to comprise a processor "P", a memory "M" and a communication circuit "C" with suitable equipment for transmitting and receiving radio signals in the manner described herein.

The communication circuit C in each of the access point 800 and the wireless device 802 thus comprises equipment configured for communication with each other over a radio interface using a suitable protocol for radio communication depending on the implementation. The solution is however not limited to any specific types of data or protocols.

Figure 3:
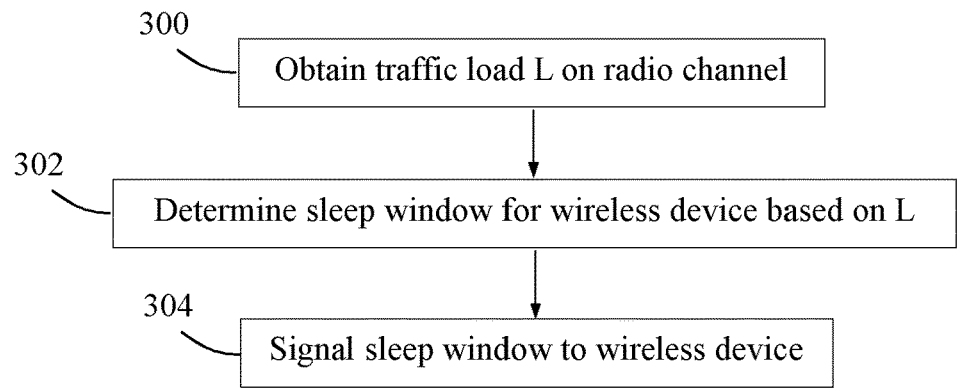
FIG. 3 is a flow chart illustrating a procedure in an access point, according to further possible embodiments.
Figure 4:
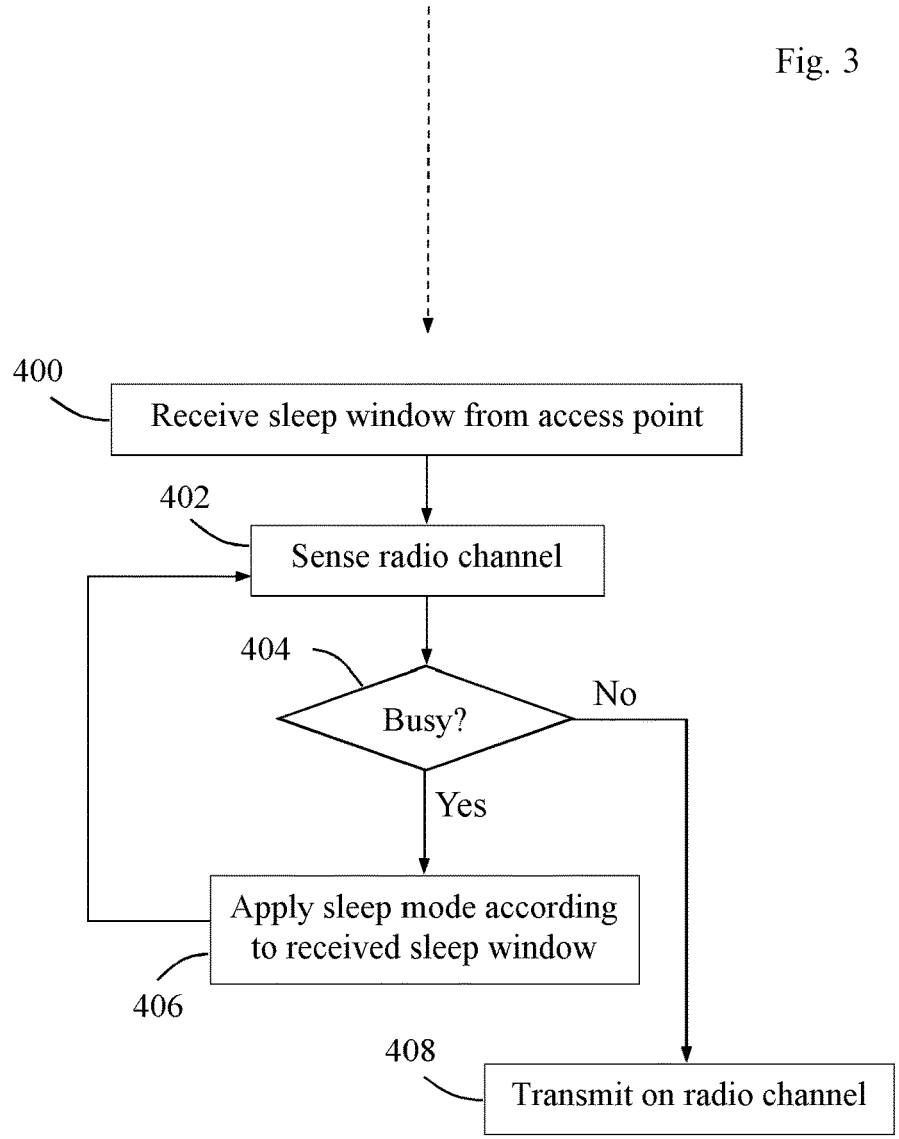
FIG. 4 is a flow chart illustrating a procedure in a wireless device, according to further possible embodiments.

The access point 800 comprises means configured or arranged to perform the actions 300-304 of the flow chart in FIG. 3 in the manner described above. Further, the wireless device 802 comprises means configured or arranged to perform at least some of the actions 400-408 of the flow chart in FIG. 4 in the manner described above. The actions of FIGS. 3 and 4 may be performed by means of functional modules in the respective processor P in the access point 800 and the wireless device 802.

The access point 800 is arranged to assist a wireless device 802 to perform contention-based access on a radio channel for uplink transmission to the access point 800. The access point 800 thus comprises the processor P and the memory M, said memory comprising instructions executable by said processor, whereby the access point 800 is operative as follows.

The access point 800 is operative to obtain a traffic load L on the radio channel. This obtaining operation may be performed by an obtaining module 800a in the access point 800, e.g. in the manner described for action 300 above. The access point 800 is also operative to determine a sleep window for the wireless device based on the obtained traffic load L on the radio channel so that the sleep window increases when the traffic load L increases. This determining operation may be performed by a determining module 800b in the access point 800, e.g. in the manner described for any of actions 302, 6.1 and 7:2 above.

The access point 800 is further operative to signal the sleep window to the wireless device to instruct the wireless device to apply sleep mode according to the sleep window when the wireless device senses that the radio channel is busy. This signalling operation may be performed by a signalling module 800c in the access point 800, e.g. in the manner described for any of actions 304, 6.2 and 7:3 above.

The wireless device 802 is arranged for contention-based access on a radio channel for uplink transmission to an access point 800, the wireless device comprising a processor P and a memory M, said memory comprising instructions executable by said processor whereby the wireless device 802 is operative as follows.

The wireless device 802 is operative to receive a sleep window from the access point 800 which is dependent on a traffic load L on the radio channel so that the sleep window increases when the traffic load L increases. This receiving operation may be performed by a receiving module 802a in the wireless device 802, e.g. in the manner described for action 400 above. The wireless device 802 is also operative to apply sleep mode according to the sleep window when the wireless device senses that the radio channel is busy. This applying operation may be performed by a sleep mode module 802b in the wireless device 802, e.g. in the manner described for action 406 above. The wireless device 802 may further comprise a determining module 802c which may be used in an alternative variant where it is the wireless device 802 that determines the sleep window based on the traffic load L, which will be described in more detail below.

It should be noted that FIG. 8 illustrates various functional modules in the access point 800 and the wireless device 802, respectively, and the skilled person is able to implement these functional modules in practice using suitable software and hardware. Thus, the solution is generally not limited to the shown structures of the access point 800 and the wireless device 802, and the functional modules 800a-c and 802a-b therein may be configured to operate according to any of the features and embodiments described in this disclosure, where appropriate.

The functional modules 800a-c and 802a-b described above can be implemented in the access point 800 and the wireless device 802, respectively, by means of program modules of a respective computer program comprising code means which, when run by the processor P causes the access point 800 and the wireless device 802 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the access point 800 and the wireless device 802 in the form of a memory having a computer readable medium and being connected to the processor P. The computer program product or memory M in each of the access point 800 and the wireless device 802 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective access point 800 and wireless device 802.

The solution described herein may be implemented in each of the access point 800 and the wireless device 802 by a computer program comprising instructions which, when executed on at least one processor, cause the at least one processor to carry out the actions according to any of the above embodiments, where appropriate. The solution may also be implemented at each of the access point 800 and the wireless device 802 in a carrier containing the above computer program, wherein the carrier is one of an electronic signal, optical signal, radio signal, or computer readable storage medium.

In the embodiments and features described above, the determination of the sleep window was performed by the access point and the sleep window was signaled from the access point to the wireless device. Alternatively, the access point may signal the traffic load to the wireless device and the determination of the sleep window may then be performed by the wireless device instead. In this case the wireless device may determine the sleep window according to any of the above-described embodiments for how the sleep window may be calculated, with the difference that it is performed by the wireless device based on the traffic load signaled by the access point. An example of such a procedure will now be described with reference to the flow charts in FIGS. 9 and 10.

Figures 9, 10:
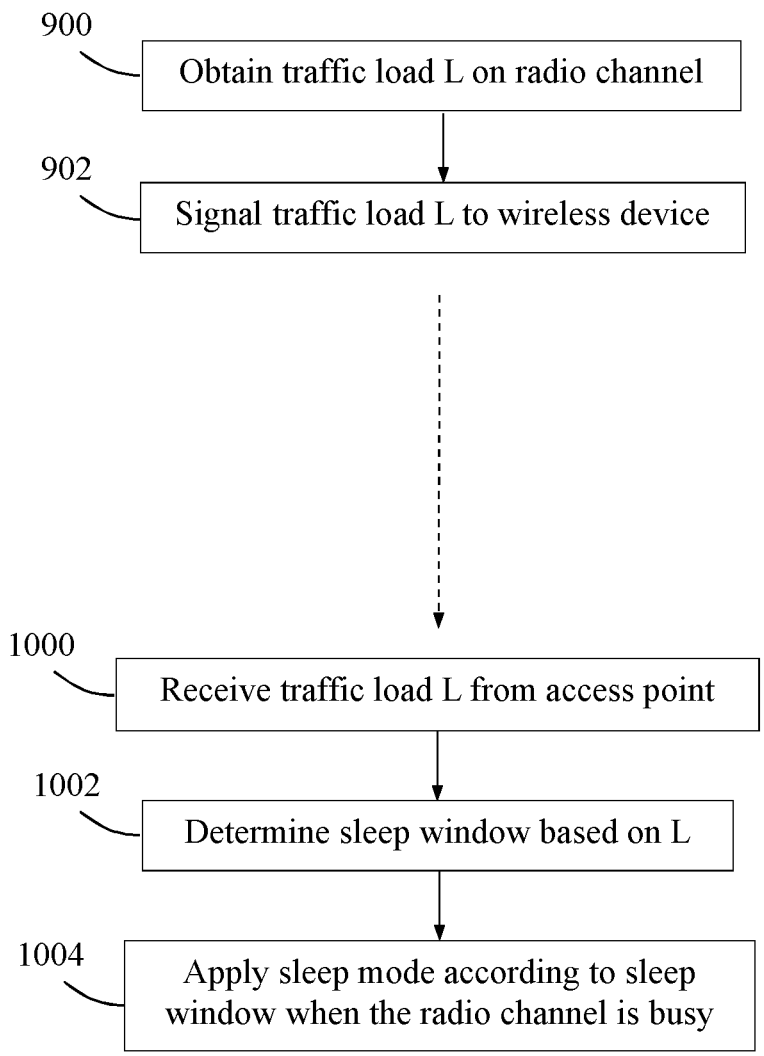
FIG. 9 is a flow chart illustrating an alternative procedure in an access point, according to further possible embodiments.
FIG. 10 is a flow chart illustrating an alternative procedure in a wireless device, according to further possible embodiments.

FIG. 9 illustrates a procedure performed by an access point, e.g. the access point 800, for assisting a wireless device, e.g. the wireless device 802, to perform contention-based access on a radio channel for uplink transmission to the access point 200. In this method example, the access point obtains a traffic load L on the radio channel, as shown by an action 900, which may be done as described above for action 300. The access point then signals the traffic load L to the wireless device, as shown by an action 902, thereby enabling the wireless device to determine a sleep window based on the signalled traffic load L so that the sleep window increases when the traffic load L increases, and to apply sleep mode according to the sleep window when the radio channel is busy.

The access point 800 in FIG. 8 may thus be arranged to assist a wireless device 802 to perform contention-based access on a radio channel for uplink transmission to the access point 800, as follows. The wireless device comprises a processor P and a memory M, said memory comprising instructions executable by said processor whereby the wireless device 802 is operative to:

obtain a traffic load L on the radio channel, e.g. by means of the obtaining module 800a, and signal the traffic load L to the wireless device, e.g. by means of the signalling module 800c, thereby enabling the wireless device to determine a sleep window based on the signalled traffic load L so that the sleep window increases when the traffic load L increases, and to apply sleep mode according to the sleep window when the radio channel is busy.

FIG. 10 illustrates a procedure performed by a wireless device, e.g. the wireless device 802, for contention-based access on a radio channel for uplink transmission to an access point 800. In this method, the wireless device receives a traffic load L on the radio channel from the access point, in an action 1000. The wireless device then determines a sleep window based on the received traffic load L so that the sleep window increases when the traffic load L increases, in another action 1002, which may be done basically according to the embodiments described above. For example, the traffic load signalled from the access point may comprise the above-described expected transmission time TTx of a competing user of the radio channel, such that the wireless device is able to use the above formulas f(L, Tbusy) and g(L, Tbusy) to determine the sleep window in the manner described above. In a final shown action 1004, the wireless device applies sleep mode according to the sleep window when the wireless device senses that the radio channel is busy which may be done as described above for action 406.

The wireless device 802 in FIG. 8 may thus be arranged for contention-based access on a radio channel for uplink transmission to an access point 800 as follows. The wireless device comprises a processor P and a memory M, said memory comprising instructions executable by said processor whereby the wireless device 802 is operative to:

receive a traffic load L on the radio channel from the access point, e.g. by means of the receiving module 802a, determine a sleep window based on the received traffic load L so that the sleep window increases when the traffic load L increases, e.g. by means of the determining module 802c, and apply sleep mode according to the sleep window when the wireless device senses that the radio channel is busy, e.g. by means of the sleep mode module 802b.

While the solution has been described with reference to specific exemplifying embodiments, the description is generally only intended to illustrate the inventive concept and should not be taken as limiting the scope of the solution. For example, the terms "access point", "wireless device", "traffic load", "sleep window", and "sleep parameters" have been used throughout this disclosure, although any other corresponding entities, functions, and/or parameters could also be used having the features and characteristics described here. The solution is defined by the appended claims.

The invention claimed is:

1. A method performed by an access point for assisting a wireless device to perform contention-based access on a radio channel for uplink transmission to the access point, the method comprising:

obtaining a traffic load value indicative of a traffic load on the radio channel;

determining a sleep window for the wireless device based on the obtained traffic load value indicative of the traffic load on the radio channel so that the sleep window increases when the traffic load increases; and signaling the sleep window to the wireless device to instruct the wireless device to apply a sleep mode according to the sleep window when the wireless device senses that the radio channel is busy, wherein the access point signals the sleep window as a minimum duration SWmin and a maximum duration SWmax to instruct the wireless device to use a sleep duration in the sleep mode between the minimum duration SWmin and the maximum duration SWmax.

2. The method of claim 1, wherein the access point signals the sleep window by broadcasted signaling or by dedicated signaling to the wireless device.

3. The method of claim 1, wherein the access point determines the minimum duration SWmin by applying a first function on the traffic load value and determines the maximum duration SWmax by applying a second function on the traffic load value.

4. The method of claim 1, wherein the step of determining a sleep window for the wireless device based on the obtained traffic load value comprises using a first function, which relates load values to sleep windows, to determine the sleep window to which the obtained load value is related, the first function relates the first load value to the determined sleep window, the first function relates a second load value to a second sleep window, the first load value is greater than the second load value, and the determined sleep window is greater than the second sleep window.

5. An access point arranged to assist a wireless device to perform contention-based access on a radio channel for uplink transmission to the access point, the access point comprising a processor (P) and a memory (M), said memory comprising instructions executable by said processor whereby the access point is operative to:

obtain a traffic load value indicative of a traffic load on the radio channel;

determine a sleep window for the wireless device based on the obtained traffic load value indicative of a traffic load on the radio channel so that the sleep window increases when the traffic load increases; and signal the sleep window to the wireless device to instruct the wireless device to apply sleep mode according to the sleep window when the wireless device senses that the radio channel is busy, wherein the access point is operative to signal the sleep window as a minimum duration SWmin and a maximum duration SWmax to instruct the wireless device to use a sleep duration in the sleep mode between the minimum duration SWmin and the maximum duration SWmax.

6. The access point of claim 5, wherein the access point is operative to signal the sleep window by broadcasted signaling or by dedicated signaling to the wireless device.

7. The access point of claim 5, wherein the access point is operative to determine the minimum duration SWmin by applying a first function on the traffic load value and determines the maximum duration SWmax by applying a second function on the traffic load value.

8. A method performed by a wireless device for contention-based access on a radio channel for uplink transmission to an access point, the method comprising:

receiving a sleep window from the access point which is dependent on a traffic load on the radio channel so that the sleep window increases when the traffic load increases; and applying sleep mode according to the sleep window when the wireless device senses that the radio channel is busy, wherein the wireless device receives the sleep window as a minimum duration SWmin and a maximum duration SWmax, as an instruction to use a sleep duration in the sleep mode between the minimum duration SWmin and the maximum duration SWmax.

9. The method of claim 8, wherein the wireless device receives the sleep window in broadcasted signaling or in dedicated signaling.

10. The method of claim 8, wherein the wireless device uses the maximum duration SWmax after a first time the wireless device senses that the radio channel is busy and uses a random sleep duration between the minimum duration SWmin and the maximum duration SWmax after a next time the wireless device senses that the radio channel is busy.

11. A wireless device arranged for contention-based access on a radio channel for uplink transmission to an access point, the wireless device comprising a processor (P) and a memory (M), said memory comprising instructions executable by said processor whereby the wireless device is operative to:

receive a sleep window from the access point which is dependent on a traffic load on the radio channel so that the sleep window increases when the traffic load increases; and apply sleep mode according to the sleep window when the wireless device senses that the radio channel is busy, wherein the wireless device is operative to receive the sleep window as a minimum duration SWmin and a maximum duration SWmax, as an instruction to use a sleep duration in the sleep mode between the minimum duration SWmin and the maximum duration SWmax.

12. The wireless device of claim 11, wherein the wireless device is operative to receive the sleep window in broadcasted signaling or in dedicated signaling.

13. The wireless device of claim 11, wherein the wireless device is operative to use the maximum duration SWmax after a first time the wireless device senses that the radio channel is busy, and to use a random sleep duration between the minimum duration SWmin and the maximum duration SWmax after a next time the wireless device senses that the radio channel is busy.

* * * * *